United States Patent Office 3,301,374
Patented Jan. 31, 1967

3,301,374
DUAL RATE INDEXING SYSTEM FOR
MACHINE TOOLS
Robert W. Proctor, St. Clair Shores, Mich., assignor to
The Cross Company, a corporation of Michigan
Filed May 5, 1965, Ser. No. 453,359
23 Claims. (Cl. 198—19)

This invention relates to an indexing system for machine tools and more particularly to an indexing mechanism for transferring a workpiece from station to station at either a rapid or a slow rate of travel.

As is well known in automated machining, a workpiece is transferred between selective stations wherein different operations are performed upon it. In some instances it is desirable to index the workpiece rapidly from station to station. In other instances, the piece must be moved slowly through a station so that hand assembly or other types of operations may be performed on it while it is traveling. Frequently, both rapid and slow transfer are required in the automatic machining of a workpiece. Variable rate transfer systems have been proposed, but these systems have not been completely satisfactory because of the high cost and complicated structure required to produce various speeds. Generally, a variable rate transfer of the type referred to has been accomplished by varying the speed of the transfer motor or by utilizing a complex gear and transmission system.

It is the principal object of this invention to provide a simplified dual rate indexing system for machine tools.

It is a further object of this invention to provide a dual rate transfer system that lends itself to use in a great number of applications with minimum change in the machine.

It is a further object of this invention to provide an improved indexing mechanism for rapidly advancing a workpiece between automated work stations and for slowly transferring a workpiece through a station wherein manual operations are performed upon the workpiece.

In transfer and indexing mechanisms, the workpiece may be supported upon a table or pallet or the indexing mechanism may operate directly upon the workpiece. The disclosed mechanism may be used to transport workpieces directly or to transport workpieces that are supported upon a table or pallet. Throughout the specification and claims the term "carrier" has been employed as a generic term that includes tables, pallets or directly supported workpieces.

An indexing mechanism for transferring a workpiece to successive stations embodying this invention includes a carrier. First and second transfer drive mechanisms are provided that are driven at different speeds. First coupling means coact between the carrier and the first transfer drive mechanism for coupling the carrier to the first transfer drive mechanism for transferring the carrier between successive stations at a first rate of speed. A second coupling mechanism is provided between the carrier and the second transfer drive mechanism for coupling the carrier to the second transfer drive mechanism for moving the carrier between other successive stations at a second rate of speed.

Further objects and advantages of this invention will become more apparent as this description proceeds, particularly when considered in conjunction with the accompanying drawings, wherein:

FIGURE 2 is a cross-sectional view taken substantially along the line 2—2 of FIGURE 1;

FIGURE 3 is a cross-sectional view taken substantially along the line 3—3 of FIGURE 2;

FIGURE 4 is a flow diagram showing a typical sequence of stations in a transfer machine with which the transfer mechanism of FIGURES 1 through 3 may be employed.

Figure 1:
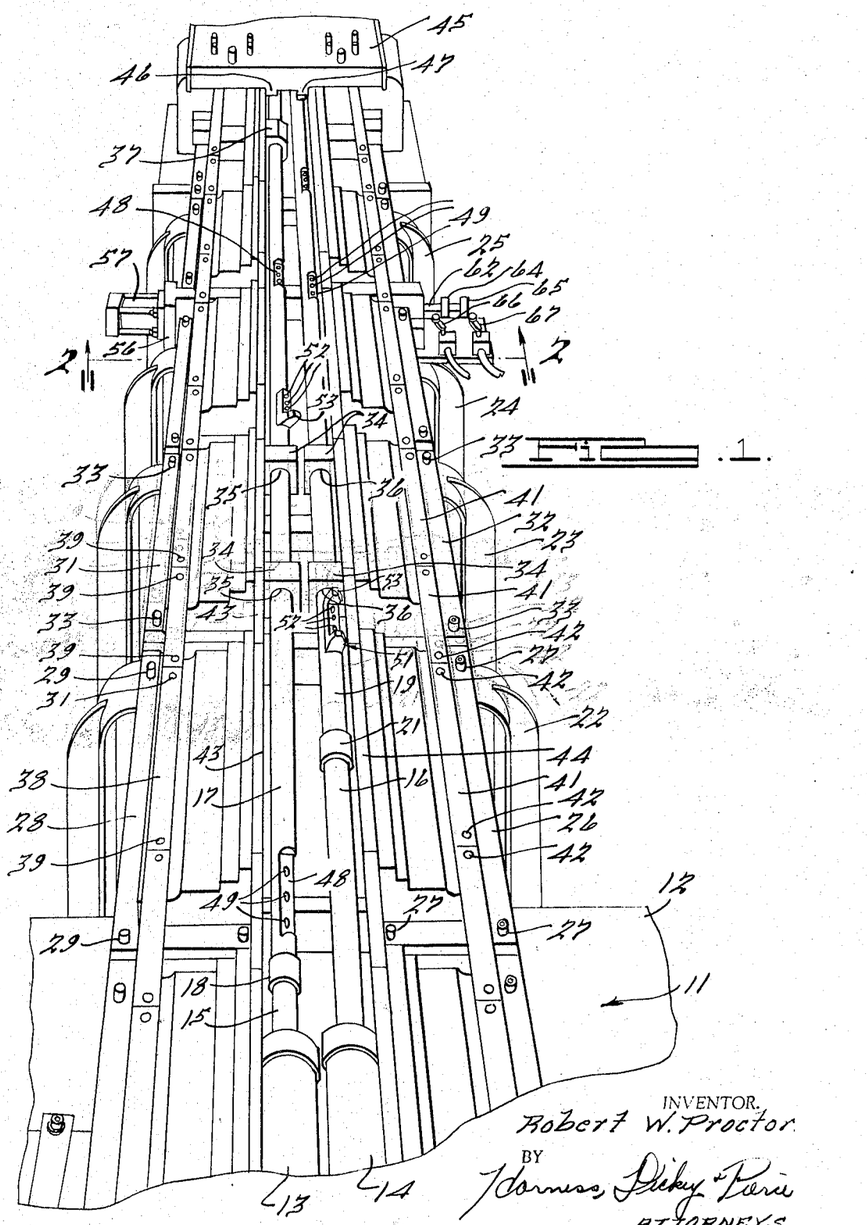
FIGURE 1 is a perspective view, taken from above, of a simplified portion of a transfer machine of a type providing a typical environment for a dual transfer mechanism of this invention.

Referring now in detail to the drawings, FIGURES 1 through 3 illustrate a preferred embodiment of the invention in the form of a transfer mechanism for moving workpieces in a straight line between longitudinally spaced work stations. The transfer mechanism includes a transfer bar drive assembly, indicated generally by the reference numeral 11, and usually located at the middle of the machine, although it may be located at either end or at any other convenient location along its length. Although only one side of the drive assembly 11 is shown, it is to be understood that the opposite side is the same since it is located at the middle of the machine. The transfer bar drive assembly 11 includes a hydraulic cylinder supporting table 12 that supports a slow transfer cylinder 13 and a rapid transfer cylinder 14. The pistons that are contained within hydraulic cylinders 13 and 14 are drivingly coupled to piston rods 15 and 16, respectively. Although the hydraulic cylinders 13 and 14 are constructed so that the piston rods 15 and 16 have the same stroke during a cycle of operation, the rate of advance of the piston rod 15 is much slower than the rate of advance of the piston rod 16. Each of the piston rods 15 and 16 is returned at the same rate of speed, however, and the rate of return is equal to the rate of advance of the rapid piston rod 16. It is to be understood that a suitable conventional hydraulic and electrical mechanism may be provided for actuating the cylinders 13 and 14 and their associated pistons and piston rods. FIGURE 5 illustrates schematically a typical control system as will become apparent as this description proceeds.

The piston rod 15 is drivingly coupled to a slow transfer bar 17 by a coupling 18 that insures that the transfer bar 17 and piston rod 15 will reciprocate together, but the coupling 18 allows the transfer bar 17 to rotate with respect to the piston rod 15. A rapid transfer bar 19 that is disposed alongside of the slow transfer bar 17 and parallel to it is coupled to the piston rod 16 by a coupling 21 that is similar to the coupling 18.

Inverted U-shaped supporting legs 22, 23, 24 and 25 are positioned on one side of the hydraulic cylinder supporting table 12 at equal longitudinally spaced locations. Although only four supporting legs are shown, it is to be understood tha any number of legs may be used depending upon the length of the transfer mechanism.

Stations wherein work is performed upon the workpieces may be provided between adjacent pairs of the legs 22, 23, 24 and 25. The stations may accommodate automatic machining or assembling apparatus or manual machining or assembling operations. The structure present at the various stations that does not form a part of the transfer mechanism has not been illustrated to simplify the drawings.

A first pallet support 26 extends from the table 12 to to supporting leg 22 at one side of the latter. The pallet support 26 is affixed to the leg 22 and the table 12 by bolts 27. A similar pallet support 28 is affixed to the table 12 and leg 22 at the other side thereof by bolts 29. Transfer bar and pallet supports 31 and 32 extend between the legs 22 and 23 at each side thereof. The transfer bar and pallet supports 31 and 32 are fixed to the legs 22 and 23 by bolts 33. The transfer bar and pallet supports 31 and 32 are substantially the same as the pallet supports 26 and 28, but include inwardly extending bosses 34 having bearing apertures 35 and 36 for supporting the slow and rapid transfer bars 17 and 19, respectively. Similar transfer bar and pallet supports or pallet supports may extend between remaining adjacent pair of supporting legs. The sequence the transfer bar and pallet supports or pallet supports are positioned along the length of the transfer mechanism may be altered to meet the requirement of any given installation. In some instances, it may be desirable only to provide one transfer bar and pallet support between an adjacent pair of supporting legs. Such a single support is indicated by the reference numeral 37 in FIGURE 1.

The supports at the left hand side of the machine are formed with grooves that receive segments of pallet guides or ways 38 that extend along the length of the machine. The ways 38 are fixed to the supports by countersunk bolts 39. In a like manner, the supports at the right hand side of the machine are formed with grooves that receive similar segments of pallet guides or ways 41, fixed to the respective pallet supports by countersunk bolts 42. In a like manner, pallet guide rails 43 are affixed to the inner ends of the supports at the left hand side of the machine and pallet guide rails 44 are affixed to the supports at the right hand side of the machine.

A pallet 45 is supported on the guides 38 and 41 and rails 43 and 44 above the transfer bars 17 and 19. The pallet 45 has a pair of depending tongues 46 and 47 that are engaged on their sides by the pallet guide rails 43 and 44, respectively. The coaction between the guide rails 43 and 44 and the tongues 46 and 47 locates the pallet 45 transversely with respect to the machine. The guides 38 and 41 also engage the underside of the pallet 45 (FIGURE 2) to support it during its travel along the transfer mechanism. One or more workpieces may be affixed to the pallet 45 in a known manner.

Each of the transfer bars 17 and 19 is provided with a plurality of longitudinally spaced, flattened recesses 48. The recesses 48 are all angularly aligned on a given transfer bar and are equally spaced along it. A plurality of tapped holes 49 are formed in the recesses 48. Locking dogs 51 may be affixed to the transfer bars 17 and 19 by means of bolts 52 that extend into the tapped holes 49 of the recesses 48. The locking dogs 51 have one or more teeth or dogs 53 that coact with corresponding recesses 54 (FIGURES 2 and 3) that are formed in the tongues 46 and 47 at each end of the pallet 45.

The transfer bars 17 and 19 are supported for limited rotational or pivotal movement as well as reciprocation. As has been noted earlier, the couplings 18 and 21 between the transfer bars 17 and 19 and the piston rods 15 and 16 accommodate the pivotal movement. Because the locking dogs 51 are fixed on the transfer bars 17 and 19, the angular position of the transfer bars 17 and 19 will determine when the locking dogs 51 are in engagement with the corresponding recesses 54 of the pallet 45. The mechanism illustrated in more detail in FIGURE 2 is provided to rotate the transfer bars 17 and 19 in unison and accordingly to couple and uncouple the locking dogs 51 to and from the pallet 45. The locking dogs 51, therefore, act to couple the pallet 45 to either the rapid transfer bar 19 or to the slow transfer bar 17.

The transfer bar rotating mechanism comprises a hollow bar-shaped base 56 that is supported beneath an adjacent pair of pallet supports and between a pair of adjacent supporting legs. In the illustrated embodiment, the base 56 is positioned between the legs 24 and 25. A hydraulic cylinder 57 is supported at one side of the base 56. The hydraulic cylinder has a piston rod 58 that is adjustably coupled by a screw end 59 thereof to a shaft 61 that is supported for reciprocation in a bore that extends transversely through the base 56. A shaft 62 has a threaded end 63 that is received in a tapped hole in the outer end of the shaft 61. The shaft 62 carries a pair of trip dogs 64 and 65 that coact with limit switches 66 and 67, respectively, for controlling the operation of the hydraulic cylinder 57 in a manner which will become apparent as this description proceeds.

Segmented cylindrical surfaces 68 and 69 are formed in the upper portion of the base 56 to support the transfer bars 17 and 19, respectively, for reciprocation and rotation. Wedges 71, 72 and 73 are affixed to the base 56 by a plurality of bolts 74 to retain the transfer bars 17 and 19 within the bearing surfaces 68 and 69 while permitting free longitudinal and rotary motion with respect thereto.

A pair of segmented cylindrical cams 75 and 76 are supported within rectangular recesses 77 and 78 formed across the upper central portion of the shaft 61. Pins or keys 79 and 81 are received within cylindrical bores 82 and 83 that are formed in the cams 75 and 76, respectively. The upper ends of the pins 79 and 81 are received in cylindrical bores 84 and 85 formed in the transfer bars 17 and 19, respectviely. The cams 75 and 76 are free to move in a vertical direction relative to the recesses 77 and 78 and rotate therein, but are fixed in a direction along the axis of the shaft 61 by the contact of the sides of the recesses 77 and 78 with the cams 75 and 76.

It should be readily apparent that reciprocation of the piston rod 58 caused by actuation of the hydraulic cylinder 57 will cause the shaft 61 to reciprocate. Reciprocation of the shaft 61 is transmitted to oscillatory movement of the transfer bars 17 and 19 by the cams 75 and 76 and pins 79 and 81. When the shaft 61 is moved to the limit of its travel to the right, as viewed in FIGURE 2, by movement of the piston rod 58 to the outer limit of its stroke, the locking dog 53 will be in the dotted line position and in engagement with the recess 54 in the tongue 46 of the pallet 45 and the slow transfer bar 17 will be coupled to the pallet 45. In a like manner, the dogs 51 carried by the rapid transfer bar 19 will be out of engagement with the pallet 45. When the shaft 61 is retracted to the extreme left hand position and the piston rod 58 is fully retracted, the locking dog 51 carried by the rapid transfer bar 19 will be in engagement with the recess 54 in the tongue 47 and the pallet 45 will be coupled to the rapid transfer bar 19. The slow transfer bar 17 will then be disengaged from the pallet 45. From the foregoing discussion it should be readily apparent that the coupling devices for coupling the transfer bars 17 and 19 to the pallet 45, because they are actuated by a common member, operate simultaneously. Also, the coupling to the fast transfer bar 19 with the pallet 45 is accomplished simultaneously with uncoupling of the slow transfer bar 17 from the pallet 45 and vice versa.

Figure 5A:
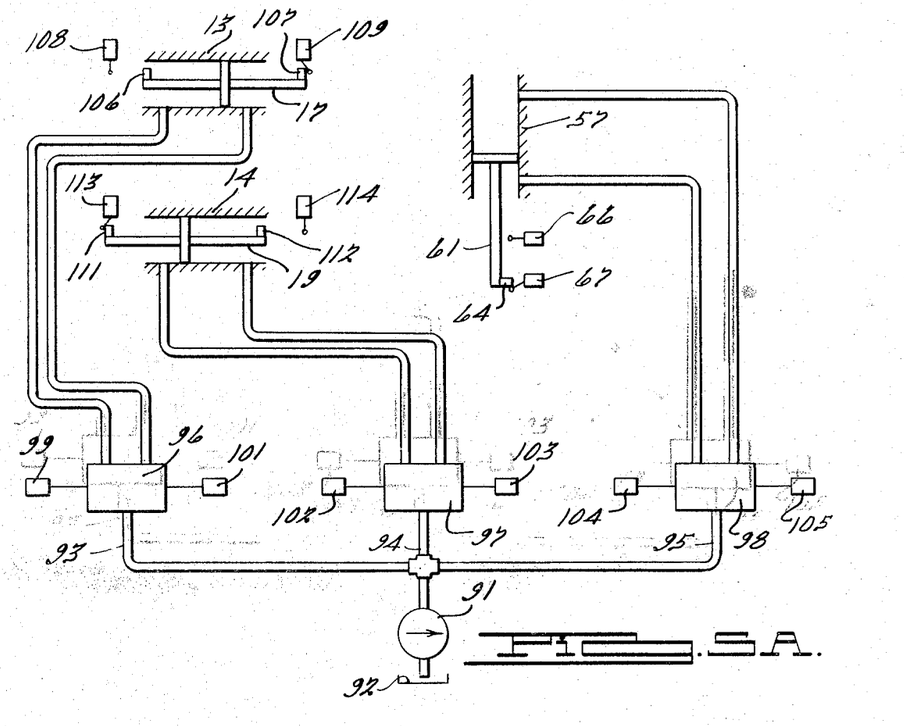
FIGURE 5 is a schematic diagram of a typical control circuit which may be used in the transfer mechanism of FIGURES 1 through 3.
Figure 5B:
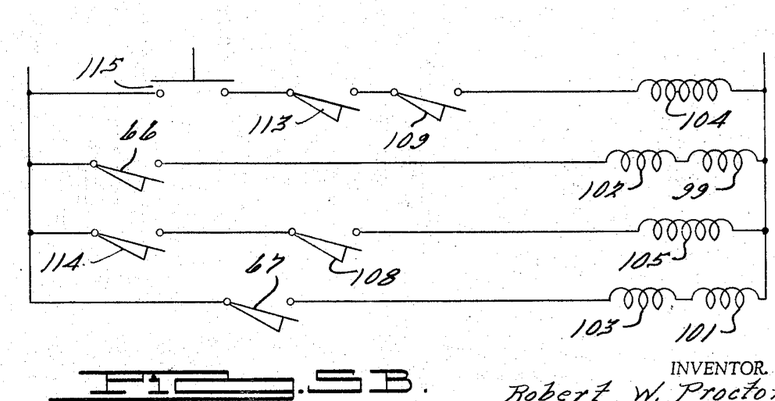

Referring now to FIGURE 5a illustrates schematically a hydraulic circuit for the transfer mechanism previously described and FIGURE 5b illustrates schematically an electrical wiring diagram in sequence form. It is to be understood that the hydraulic and electrical controls described represent a simplified system and that various other control circuits and hydraulic systems may be used without departing from the invention.

Referring first to the hydraulic circuit in FIGURE 5a, a pump 91 draws hydraulic fluid from a sump 92 and discharges it under a constant pressure to the delivery lines 93, 94 and 95. The line 93 is connected to a control valve 96 for the slow transfer cylinder 13. The line 94 extends to a control valve 97 for the rapid transfer cylinder 14. The line 95 is connected to a control valve 98 for the hydraulic cylinder 57 that actuates the locking dogs 51 for coupling the transfer bars to the pallet. The control valves 96 and 97 and 98 each have a pair of actuating solenoids 99 and 101, 102 and 103, and 104 and 105, respectively.

The slow transfer bar 17 carries a pair of trip devices 106 and 107, that are adapted to cooperate with limit switches 108 and 109, respectively. The rapid transfer bar 19 carries a pair of trip devices 111 and 112 that are adapted to cooperate with limit switches 113 and 114, respectively. The shaft 61 that is actuated by the hydraulic cylinder 57 carries a trip dog 64 that coacts with the limit switches 66 and 67.

Referring now to FIGURE 5b, the electrical circuit diagram for the machine is shown in the schematic, sequential form. The solenoid coil 104 of the valve 98 is wired in circuit with the contacts of the limit switches 113 and 109 actuated by the fast and slow transfer bars, respectively. The solenoid coils 102 and 99 of the valves 97 and 96 are wired in circuit with the limit switch 66 actuated by the locking dog shaft 61. The solenoid coil 105 of the valve 98 is wired in circuit with the limit switches 114 and 108 actuated by the fast transfer bar 19 and slow transfer bar 17, respectively. The solenoid coils 103 and 101 of the valves 97 and 96 are wired in circuit with the limit switch 67 that is actuated by the locking dog actuating shaft 61. It is to be understood that each of the limit switches is a normally open switch, that is, its contacts are spring biased to an open position whereby no current will flow.

Referring now to the sequence of operation, it will be assumed that the machine has stopped with the slow transfer bar 17 at the end of its advance stroke and the rapid transfer bar 19 at its retracted or home position. The locking dogs carried by the slow transfer bar 17 will still be engaged with the pallets and the locking dogs carried by the rapid transfer bar 19 are disengaged from the pallets. At the home position, as illustrated in FIGURE 5a, the switches 109, 113 and 67 actuated by the slow transfer bar 17, rapid transfer bar 19 and locking dog actuating shaft 61 respectively, are all closed. If a start cycle switch, indicated schematically by the reference numeral 115 in FIGURE 5b, is closed, current will flow through the solenoid coil 104 to actuate the valve 98 so that hydraulic fluid will move the locking dog actuating shaft 61 in the proper direction to engage the locking dogs of the rapid transfer bar 19 with the pallets that are positioned to be engaged by them. The locking dogs carried by the slow transfer bar 17 will then be simultaneously disengaged from their respective pallets. Movement of the locking dog actuating shaft 61 continues until the trip device 64 closes the switch 66. When this occurs, current will flow through the solenoid coils 99 and 102 so that the valves 96 and 97 are energized to cause the fast transfer bar 19 to be advanced and the slow transfer bar 17 to be retracted. As has been noted earlier, the rate of retraction of the slow transfer bar 17 is identical to the rate of advance of the rapid transfer bar 19. This rate is also equal to the rate of return of the rapid transfer bar 19. The rapid transfer bar 19 will advance and the slow transfer bar 17 retract until the switches 114 and 108, respectively, are closed simultaneously. When this occurs, current will flow through the solenoid coil 105 and the valve 98 will be actuated so that the locking dog actuating shaft 61 is moved to disengage the locking dogs 51 of the rapid transfer bar 19 from the respective pallets and engage the slow transfer bar 17 with the pallets. When the locking dog actuating shaft 61 completes its movement, the trip device 64 will contact the limit switch 67 and current will flow through the solenoid coils 101 and 103, actuating the valves 96 and 97, respectively. When the valves 96 and 97 are actuated by the solenoid coils 101 and 103, the rapid transfer bar 19 will be retracted at a high rate of speed and the slow transfer bar will begin its outward movement at a low rate of speed.

Since the slow transfer bar 17 advances at a slower rate of speed than the rate at which the rapid transfer bar 19 retracts, the rapid transfer bar 19 will sit idle at its home or retracted position during a portion of the advance of the slow transfer bar 17. The cycle will then repeat until it is stopped by opening a suitable shut off switch (not shown).

A typical sequence of operation of an automatic machining operation embodying this invention is shown in FIGURE 4. The blocks in this figure represent various stations along the length of an automating machine wherein both automatic machining or assembling and manual machining or assembling operations are performed upon workpieces. The head of the machine lies at the left hand side of FIGURE 4 and a first station 121 is a loading station wherein pallets 45 which have been loaded with workpieces may be moved onto the guide rails and ways of the transfer machine. An automatic station 122 follows the loading station 121. Stations 123, 124 and 125 follow the automatic station 122. The workpieces are transferred slowly through the stations 123, 124 and 125 so that hand machining or assembling operations may be performed upon the pieces as they are transferred through these stations. Automatic stations 126 and 127 follow the station 125. Stations 128 and 129 follow the automatic station 127. Additional manual operations may be performed upon the workpieces when they are in these stations and the pallets may be unloaded from the transfer machine at the end of the station 129.

The sequence of transfer of a workpiece and its supporting pallet through the machine shown in FIGURE 4 will now be described by reference to a single pallet. It is to be understood that a plurality of workpieces and pallets are present in the machine at a given time and the positioning of the respective pallets will be described after the description of the flow of a single pallet.

A pallet 45 is loaded upon the transfer mechanism at the station 121 during the time that the fast transfer bar 19 is at its home or retracted position. The slow transfer bar 17 may be advancing or at a dwell position during this operation. The shaft 61 of the mechanism that actuated the dogs 51 is at its extended position so that the locking dogs 51 carried by the rapid transfer bar 19 will be in their disengaged positions. When the pallet 45 is in place on the loading station 121 it is ready to be engaged by the locking dogs 51 carried by the rapid transfer bar 19. When the shaft 61 is retracted, these locking dogs will engage the pallet. After the rapid transfer bar 19 is engaged with the pallet 45, the transfer bar 19 is advanced by its hydraulic cylinder 14 at a high rate of speed. At the completion of the stroke of the rapid transfer bar 19 the pallet 45 is positioned in the station 122. The shaft 61 is then advanced and the locking dogs 51 are disengaged from the pallet 45. A suitable locating and clamping mechanism (not shown) with which machines of this type conventionally are equipped may then be operated to position the pallet 45 and to hold it securely so that an automatic machining or assembling operation may be performed upon the workpiece carried by it.

The slow transfer bar 17 has been retracted during the advance of the rapid transfer bar 19. The slow transfer bar 17 is now advanced and the rapid transfer bar 19 is retrcted during the initial advance of the slow transfer bar 17. The slow transfer bar 17 will not have any effect upon the pallet within the station 122 since no locking dog is positioned upon it that would register with the pallet when it is in the station 122. The machining or assembling operations within the station 122 may be completed during the time that the slow transfer bar advances. At the completion of the outward stroke of the slow transfer bar 17, the shaft 61 is retracted so that the locking dogs 51 on the rapid transfer bar 19 will again engage the pallet 45 that is within the station 122.

The locating and clamping device of the automatic machine is released from the pallet 45 at this time. The pallet and workpiece is then transferred rapidly out of the automatic station 122 into the station 123.

It is important that the workpiece be transferred rapidly into and rapidly out of the stations wherein the automatic machining or assembling is done so that maximum time is available for the automtic operation and so that the cycle time of the machine can be kept to a minimum. Because of the alternate rapid and slow transfer of the workpieces performed by this transfer mechanism, a blank or idle station will exist along the length of the machine during the various stages of operation. Preferably these blank spaces do not coincide with the automatic stations 122, 126 and 127 to insure maximum utilization of the automatic machines.

When the pallet 45 is positioned at the station 123, it is engaged with the slow transfer bar 17 which was retracted during the advance of the rapid transfer bar 19. This engagement is accomplished by means of the dogs 51 and their actuating mechanism that has already been described in detail. The pallet 45 is transferred slowly through the stations 123, 124 and 125 with a dwell occurring during the times which the slow transfer bar 17 disengages, retracts and re-engages. During the slow rate of travel, manual assembly or machining operations may be performed upon the workpiece.

At the completion of the station 125, the pallet 45 is again engaged with the rapid transfer bar 19 so that it will be moved rapidly into the automatic station 126. The cycle of operation within the station 126 is the same as that within the station 122 and it will not be described again. After the completion of the automatic operation within the station 126, the pallet 45 is transferred rapidly out of the station 126 and into the automatic station 127 wherein another automatic operation is performed.

The pallet 45 is transferred rapidly out of the station 127 by the rapid transfer bar 19 into the station 128. The slow transfer bar 17 then successively moves the pallet 45 through the stations 128 and 129 where further manual operations may be performed and the pallet 45 removed from the transfer mechanism.

It is to be understood that pallets are loaded into the machine successively at the station 121. At the completion of the advance of the rapid transfer bar 19 this station will be empty or idle, however. A pallet will always be present within the stations 122, 126 and 127 except during the transfer cycle into and out of these stations. The stations immediately following the automatic stations 122 and 127 will be idle at the end of the advancing stroke of the slow transfer bar 17 since pallets have not been transferred into these stations as yet by the rapid transfer bar 19. It also should be readily apparent that the locking dogs 51 must be staggered upon the respective transfer bars so that a pallet may be transported from one station to the next. That is, the dogs 53 must successively engage the recesses 54 at the front and then rear of the pallets 45 due to the reciprocating motion of the transfer bars 17 and 19.

To illustrate how the blank or idle spots occur in the machine, pallets have been illustrated schematically in the different stations in FIGURE 4 by the blocks 131, 132, 133, 134, 135, 136 and 137. These pallets are positioned in the stations 121, 122, 124, 125, 126, 127 and 129, respectively. This is the location of the pallets at the start of the machine cycle or immediately after completion of the advance of the slow transfer bar 17. It will be noted that the stations 123 and 128 immediately following the automatic stations 122 and 127 are empty or idle. None of the stations 122, 126 and 127 where the automatic machines are located, however, are idle. During the advance of the rapid transfer bar 19, the pallet 131 will be moved rapidly into the automatic station 122, and the pallet 132 in that station will be moved rapidly simultaneously into the station 123. The pallet 133 is not moved, nor is the pallet 137, which may be unloaded from the machine. At the same time, the pallets 134, 135 and 136 are transferred rapidly into the stations 126, 127 and 128, respectively. At the completion of the advance of the rapid transfer bar 19, the stations 121 and 125, as well as the unloading station 129 will be empty. Again, however, the stations 122, 126 and 127 where automatic operations are performed, are occupied. The slow transfer bar 17 then advances and the rapid transfer bar 19 retracts during the initial advance of the slow transfer bar 17. A new pallet may be loaded onto the loading station 121 during this time. During the advance of the slow transfer bar 17, the pallet 132 will be moved slowly to the station 124, the pallet 133 will be moved slowly to the station 125, and the pallet 136 may be moved slowly from the station 128 to the station 129. At the completion of the advance of the slow transfer bar 17, pallets will again be positioned in the same stations as appear in FIGURE 4.

It is to be understood that the machine sequence which has been illustrated, is exemplary of only one form of complete machine that may be used in conjunction with this invention. In a like manner, the control circuits per se which were described only by reference to schematic diagrams, form no part of the invention. Various changes and modifications other than those described may be made without departing from the spirit and scope of the invention, as defined by the appended claims.

What is claimed is:

1. An indexing mechanism for transferring a workpiece to successive stations comprising
   a carrier,
   a first transfer drive mechanism,
   a second transfer drive mechanism,
   means for operating said transfer drive mechanisms at different speeds,
   first coupling means for coupling said carrier to said first transfer drive mechanism for transferring said carrier between successive stations at a first rate of speed, and
   second coupling means coupling said carrier to said second transfer drive mechanism for transferring said carrier between successive stations at a second rate of speed.

2. An indexing mechanism for transferring a workpiece to successive stations comprising
   a carrier,
   a first transfer drive mechanism,
   a second transfer drive mechanism,
   means for operating said transfer drive mechanisms at different speeds,
   first coupling means for coupling said carrier to said first transfer drive mechanism for transferring said carrier between successive stations at a first rate of speed,
   second coupling means for coupling said carrier to said second transfer drive mechanism for transferring said carrier between successive stations at a second rate of speed, and
   a common actuating means for said first coupling means and said second coupling means.

3. An indexing mechanism for transferring a workpiece to successive stations comprising
   a carrier,
   a first transfer drive mechanism,
   a second transfer drive mechanism,
   means for operating said transfer drive mechanisms at different speeds,
   first coupling means for coupling said carrier to said first transfer drive mechanism for transferring said carrier between successive stations at a first rate of speed, and
   second coupling means for coupling said carrier to said second transfer drive mechanism for transferring said carrier between successive stations at a second rate of speed,
   said first coupling means being engaged simultaneous with disengagement of said second coupling means and said second coupling means being engaged simultaneously with disengagement of said first coupling means.

4. A transfer mechanism for transferring a workpiece to successive longitudinally spaced stations comprising
a pallet for supporting the workpiece,
first and second transfer bars,
means for reciprocating each of said transfer bars at a different speed,
first coupling means for coupling said pallet to said first transfer bar for transferring said pallet between successive stations at a first rate of speed, and
second coupling means for coupling said pallet to said second transfer bar for transferring said pallet between successive stations at a second rate of speed.

5. A transfer mechanism for transferring a workpiece to successive longitudinally spaced stations comprising
a pallet for supporting the workpiece,
first and second transfer bars,
means for reciprocating each of said transfer bars at a different speed,
first coupling means for coupling said pallet to said first transfer bar for transferring said pallet between successive stations at a first rate of speed,
second coupling means for coupling said pallet to said second transfer bar for transferring said pallet between successive stations at a second rate of speed, and
a common actuating means for said first and second coupling means.

6. A transfer mechanism for transferring a workpiece to successive longitudinally spaced stations comprising
a pallet for supporting the workpiece,
first and second transfer bars,
means for reciprocating each of said transfer bars at a different speed,
first coupling means for coupling said pallet to said first transfer bar for transferring said pallet between successive stations at a first rate of speed, and
second coupling means for coupling said pallet to said second transfer bar for transferring said pallet between successive stations at a second rate of speed,
said first coupling means being engaged simultaneously with disengagement of said second coupling means and said second coupling means being engaged simultaneously with disenagement of said first coupling means.

7. A transfer mechanism for transferring a workpiece between successive longitudinally spaced stations comprising
a pallet for supporting the workpiece,
a first transfer bar,
a second transfer bar,
means supporting said transfer bars for reciprocation,
means for moving each of said transfer bars in a first direction at a different rate of speed and for returning said transfer bars at the same rate of speed,
first coupling means for coupling said pallet to said first transfer bar for transferring said pallet between successive stations at a first rate of speed, and
second coupling means for coupling said pallet to said second transfer bar for transferring said pallet between successive stations at a second rate of speed.

8. A transfer mechanism for transferring a workpiece between successive longitudinally spaced stations comprising
a pallet for supporting the workpiece,
a first transfer bar,
a second transfer bar,
means supporting said transfer bars for reciprocation,
means for advancing said first transfer bar at a first rate of speed, for advancing said second transfer bar at a slower rate of speed and for returning said transfer bars at the same rate of speed, said first transfer bar being advanced during retraction of said second transfer bar and retracted during the initial advancement of said second transfer bar,
first coupling means for coupling said pallet to said first transfer bar for transferring said pallet between successive stations at a first rate of speed, and
second coupling means for coupling said pallet to said second transfer bar for transferring said pallet between successive stations at a lower rate of speed.

9. A transfer mechanism for transferring a workpiece between successive longitudinally spaced stations comprising
a pallet for supporting the workpiece,
a first transfer bar,
a second transfer bar,
means supporting said transfer bars for reciprocation,
means for advancing each of said transfer bars at a different rate of speed and for returning said transfer bars, said first transfer bar being advanced during retraction of said second transfer bar and said second transfer bar being advanced during retraction of said first transfer bar,
first coupling means for coupling said pallet to said first transfer bar for transferring said pallet between successive stations at a first rate of speed, and
second coupling means for coupling said pallet to said second transfer bar for transferring said pallet between successive stations at a second rate of speed.

10. A transfer mechanism for transferring a workpiece to successive longitudinally spaced stations comprising
a pallet for supporting the workpiece,
a first transfer bar,
a second transfer bar,
means supporting said transfer bars for reciprocation,
means for driving said transfer bars in a first direction at different rates of speed and for returning said transfer bars in the opopsite direction, one of said transfer bars being returned at the same rate of speed at which the other of said transfer bars is moved in said first direction,
first coupling means for coupling said pallet to said first transfer bar for transferring said pallet between successive stations at a first rate of speed, and
second coupling means for coupling said pallet to said second transfer bar for transferring said pallet between successive stations at a second rate of speed.

11. A transfer mechanism for transferring a workpiece between successive longitudinally spaced stations comprising
a pallet for supporting the workpiece,
a first transfer bar,
a second transfer bars,
means supporting said transfer bars for reciprocation,
means for advancing each of said transfer bars at a different rate of speed and for returning said transfer bars, said first transfer bar being advanced during retraction of said second transfer bar and said second transfer bar being advanced during retratcion of said first transfer bar,
first coupling means for coupling said pallet to said first transfer bar for transferring said pallet between successive stations at a first rate of speed, and second coupling means for coupling said pallet to said second transfer bar for transferring said pallet between successive stations at a second rate of speed,
said first coupling means being coupled and said second coupling means being uncoupled immediately prior to advancement of said first transfer bar and said first coupling means being uncoupled and said second coupling means being coupled immediately prior to advancement of said second transfer bar.

12. A transfer mechanism for transferring a workpiece to successive longitudinally spaced stations comprising
a pallet for supporting the workpiece,
first and second transfer bars supported for reciprocation beneath said pallet, means for reciprocating said transfer bars at different rate in at least one direction of their movement,
a plurality of locking dogs,
means for affixing at least one of said locking dogs to each of said transfer bars at selective longitudinal locations, recesses in said pallet adapted to receive said locking dogs, and
means for engaging one of said dogs with a corresponding recess in said pallet for simultaneous movement of said pallet with the respective transfer bar to transfer said pallet between successive stations at the desired rate of speed.

13. A transfer mechanism for transferring a workpiece to successive longitudinally spaced stations comprising
a pallet for supporting the workpiece,
first and second transfer bars supported for reciprocation beneath said pallet,
means for reciprocating said transfer bars at different rates in at least one direction of their movement, said transfer bars being returned at the same rate of speed,
a plurality of locking dogs,
means for affixing at least one of said locking dogs to each of said transfer bars at selective longitudinal lolocations,
recesses in said pallet adapted to receive said locking dogs, and
means for engaging one of said dogs with a corresponding recess in said pallet for simultaneous movement of said pallet with the respective transfer bar to transfer said pallet between successive stations at the desired rate of speed.

14. A transfer mechanism for transferring a workpiece to successive longitudinally spaced stations comprising
a pallet for supporting the workpiece,
first and second transfer bars supported for reciprocation beneath said pallet,
means for reciprocating said transfer bars at different rates in at least one direction of their movement, both of said transfer bars being returned at the same rate of speed as the speed of the fastest of the transfer bars in the said direction,
a plurality of locking dogs,
means for affixing at least one of said locking dogs to each of said transfer bars at selective longitudinal locations,
recesses in said pallet adapted to receive said locking dogs, and
means for engaging one of said dogs with a corresponding recess in said pallet for simultaneous movement of said pallet with the respective transfer bar to transfer said pallet between successive stations at the desired rate of speed.

15. A transfer mechanism for transferring a workpiece to successive longitudinally spaced stations comprising
a pallet for supporting the workpiece,
first and second transfer bars positioned below said pallet,
means supporting said transfer bars for pivotal and reciprocating motion,
means for reciprocating said transfer bars at different rates of speed in at least one direction of their travel,
a plurality of locking dogs,
means for affixing at least one of said locking dogs to each of said transfer bars at selective longitudinal locations,
recesses in said pallet adapted to receiving said locking dogs,
each of said transfer bars being pivotal from a first position wherein the respective locking dogs carried by the transfer bar are in engagement with a corresponding recess in said pallet to a second pivotal position wherein the respective locking dogs of the transfer bar are free from engagement from any recess of said pallet, and
means for pivotally moving said transfer bars between said first and said second positions for engaging the dogs of one of said transfer bars with a respective recess in said pallet for simultaneous movement of said pallet with said one transfer bar to transfer said pallet between successive stations at the desired rate of speed.

16. A transfer mechanism for transferring a workpiece to successive longitudinally spaced stations comprising
a pallet for supporting the workpiece,
first and second transfer bars positioned below said pallet,
means supporting said transfer bars for pivotal and reciprocating motion,
means for reciprocating said transfer bars at different rates of speed in at least one direction of their travel,
a plurality of locking dogs,
means for affixing at least one of said locking dogs to each of said transfer bars at selected longitudinal locations,
recesses in said pallet adapted to receiving said locking dogs,
all of the locking dogs carried by each of the respective transfer bars being positioned at the same angular position upon said respective transfer bars,
each of said transfer bars being pivotal from a first position wherein the respective locking dogs carried by said transfer bars are in engagement with a corresponding recess in said pallet to a second pivotal position wherein the respective locking dogs of said transfer bar are free from engagement from any recess of said pallet, and
means for pivotally moving said transfer bars between said first and said second positions for engaging the dogs of one of said transfer bars with a respective recess in said pallet for simultaneous movement of said pallet with said one respective transfer bar to transfer said pallet between successive stations at the desired rate of speed.

17. A transfer mechanism for transferring a workpiece to successive longitudinally spaced stations comprising
a pallet for supporting the workpiece,
first and second transfer bars positioned below said pallet,
means supporting said transfer bars for pivotal and reciprocating motion,
means for advancing said transfer bars at different rates of speed and for retracting said transfer bars, said first transfer bar being advanced during retraction of said second transfer bar and said second transfer bar being advanced during retraction of said first transfer bar,
a plurality of locking dogs,
means for affixing at least one of said locking dogs to each of said transfer bars at selected longitudinal locations,
recesses in said pallet adapted to receiving said locking dogs,
each of said transfer bars being pivotal from a first position wherein the respective locking dogs carried by said transfer bar are in engagement with a corresponding recess in said pallet to a second pivotal position wherein the respective locking dogs of said transfer bar are free from engagement from any recess of said pallet, and
means for pivotally moving said transfer bars between said first and said second positions for selectively engaging the dogs of one of said transfer bars with a respective recess in said pallet for simultaneous movement of said pallet with said one transfer bar to transfer said pallet between successive stations at the desired rate of speed.

18. A transfer mechanism for transferring a workpiece to succesive longitudinally spaced stations comprising
a pallet for supporting the workpiece,
first and second transfer bars positioned below said pallet,
means supporting said transfer bars for pivotal and reciprocating motion,
means for advancing said transfer bars at different rates of speed and for retracting said transfer bars, said first transfer bar being advanced during retraction of said second transfer bar and said second transfer bar being advanced during retraction of said first transfer bar,
a plurality of locking dogs,
means for affixing at least one of said locking dogs to each of said transfer bars at selected longitudinal locations,
recesses in said pallet adapted to receiving said locking dogs,
each of said transfer bars being pivotal from a first position wherein the respective locking dogs carried by said transfer bar are in engagement with a corresponding recess in said pallet to a second pivotal position wherein the respective locking dogs of said transfer bar are free from engagement from any recess of said pallet,
means for pivoting said first transfer bar from said first position to said second position and said second transfer bar from said second position to said first position immediately prior to advancement of said second transfer bar and for pivoting said first transfer bar from said second position to said first position and said second transfer bar from said first position to said second position immediately prior to advancement of said first transfer bar.

19. A transfer machine having a series of spaced stations and including a transfer device for indexing a plurality of workpieces successively from station to station in the machine,
certain of said stations being automatic stations where machining operations or the like are performed on the work therein,
other of said stations being work stations where manual operations or the like are performed on the work therein,
said automatic stations and said work stations being arranged in a predetermined order in said series of stations in accordance with the nature of the operations to be performed on said work, and
said transfer device being operative automatically to move said work at a relatively high rate of speed in certain of said stations and to move said work at a relatively slow rate of speed in other of said stations.

20. A transfer machine having a predetermined operating cycle, a series of spaced stations and a transfer device for indexing a plurality of workpieces successively from station to station in the machine,
certain of said stations being automatic stations where machining operations or the like are performed on the work therein,
other of said stations being work stations where manual operations or the like are performed on the work therein,
said automatic stations and said work stations being arranged in a predetermined order in said series of stations in accordance with the nature of the operations to be performed on said work, and
said transfer device having means engageable simultaneously with certain of said workpieces and operative to move the same in unison at a relatively high rate of speed into or out of said automatic stations during one portion of the machine cycle, and other means engageable simultaneously with selected workpieces and operative to move the same in unison at a relatively slow rate of speed into said work stations at during a different portion of the machine cycle.

21. A transfer machine having a series of spaced stations and including a transfer device for indexing a plurality of workpieces successively from station to station in the machine,
certain of said stations being automatic stations where machining operations or the like are performed on the work therein,
other of said stations being work stations where manual operations or the like are performed on the work therein,
said automatic stations and said work stations being arranged in a predetermined order in said series of stations in accordance with the nature of the operations to be performed on said work, and
said transfer device having separate, alternately operable fast and slow transfer means,
said fast transfer means being first simultaneously engageable with the workpieces positioned for movement into or out of said automatic stations and operable to index the same in unison along said series of stations,
said slow transfer means being simultaneously engageable with the workpieces positioned for movement into said work stations and operable after said fast transfer means to advance the workpieces engaged thereby in unison along said series of stations.

22. A transfer machine having a predetermined operating cycle, a series of spaced stations, and a transfer device for indexing a plurality of workpieces successively from station to station in the machine,
certain of said stations being automatic stations when machining operations or the like are performed on the work therein,
others of said stations being work stations where manual operations or the like are performed on the work therein,
said automatic stations and said work stations being arranged in a predetermined order in said series of stations in accordance with the nature of the operations to be performed on said work, and
said transfer device having independent separately operable fast and slow transfer means,
said fast transfer means being engageable with all of the workpieces positioned for movement into or out of said automatic stations and operable to advance the same simultaneously one station in the machine at a relatively high rate of speed at the start of the machine cycle,
said slow transfer means being engageable with selected workpieces positioned by said fast transfer means for movement into said work stations and operable after advancement of said fast transfer means to index the workpieces associated therewith one station in the machine at a relatively slow rate of speed extending for substantially the remainder of the machine cycle.

23. A transfer machine having a predetermined operating cycle, a series of spaced stations, and a transfer device for indexing a plurality of workpieces successively from station to station in the machine,
said series of stations comprising automatic stations in which machining operations or the like are performed on the work therein, work stations in which manual operations or the like are performed on the work therein, and idle stations interposed between automatic stations and immediately following work stations,
said transfer device having independent, separately operable fast and slow transfer means,
said fast transfer means being engageable with all of the workpieces positioned at the beginning of a machine cycle for movement into automatic and idle stations and operable at the start of the machine cycle to advance said workpieces simultaneously one station in the machine at a relatively high rate of speed, said slow transfer means being engageable with all of the workpieces positioned after advancement of said fast transfer means for movement into work stations and operable after said advancement by said fast fast transfer means to move the workpieces engaged thereby simultaneously one station in the machine at a relatively slow rate of speed extending for substantially the remainder of the machine cycle.

References Cited by the Examiner

UNITED STATES PATENTS 2,808,746 10/1957 Blomquist _________ 198—221 X
3,140,776 7/1964 Craver _____________ 198—221

ANDRES H. NIELSEN, *Primary Examiner.*

A. C. HODGSON, *Assistant Examiner.*